3,063,198
ARTICLES BONDED TOGETHER BY INTERNALLY NUCLEATED DEVITRIFIED SOLDER GLASSES AND METHOD OF MAKING THE SAME
Clarence L. Babcock, Toledo, Ohio, assignor to Owens-Illinois Glass Company, a corporation of Ohio
No Drawing. Filed Oct. 13, 1959, Ser. No. 846,053
20 Claims. (Cl. 189—36.5)

This invention relates to the manufacture of articles consisting of glass, ceramic, or metal components bonded together by an internally nucleated devitrified solder glass. In particular it is concerned with the preparation of composite articles which are joined by a devitrified solder glass which is non-porous in nature and resistant to electrical breakdown.

One method of using devitrified solder glass for sealing involves crushing the original melt of the solder glass to a very fine state, mixing the resulting crushed glass with an organic vehicle, applying this mixture as a coating to the surfaces to be sealed or joined together, drying the coating, and finally firing the coated surfaces over a given time-temperature cycle to effect a good bond. The devitrification of these glasses is a rate controlled process as far as the solder glass is concerned. However, it has been noted that solder glasses applied in this manner depend in a large measure upon surface initiation of devitrification and are thus very sensitive to the particular mesh size used. As a result the seals formed are more or less porous and are subject to such defects as electrical breakdown.

Accordingly it is an object of this invention to produce a composite article from devitrified solder glass in which the components are bonded together by a devitrified solder glass seal which is characterized by being non-porous, strong, and resistant to electrical breakdown. It is a further object of this invention to provide a method of manufacturing the aforementioned composite article. A still further object is to provide devitrifiable solder glass compositions which will be suitable in the above method and manifest the desired properties described above. Further objects will be evident from the description which follows.

This invention is predicated upon the discovery that the foregoing objects are attained by incorporating one or more selected oxides as internal nucleating agents in solder glasses. The method comprises first making a vitreous seal by any of the standard methods for making such seals, for example, by hot dip application of a molten solder glass, which contains one or more of the above nucleating agents, to the edges that are to be sealed or bonded together. After the vitreous seal is made, a specified sequence of heat treatments is employed which results in the conversion of the vitreous seal to a devitrified material controlled by the nucleating agents present. Such devitrified seals, which are internally nucleated, are non-porous in nature and are stronger than devitrified seals made by present known processes.

The present invention will be more completely understood by reference to the following examples in which all parts and percentages are by weight unless otherwise specified.

*Example I*

Two pieces of a preheated base glass each having a coefficient of expansion $100 \times 10^{-7}$ per ° C. are dipped repeatedly into a molten solder glass consisting of 73% PbO, 24% $B_2O_3$ and 3% $V_2O_5$ until a 2 mm. layer is built up on the edges to be joined together. The two pieces of glass are then positioned in edge to edge abutment and put into a hot furnace at the nucleating temperature of 450° C. for one hour before being heated to the devitrification temperature of 525° C. for another hour. The base glass is then annealed for 15 minutes and then cooled at about 10° C./minute to below 300° C. Upon completion of the cooling step, the solder glass seal joining the two glass articles together is observed to be strong, well bonded, non-porous, and well devitrified.

*Example II*

The procedure of Example I is repeated with the same excellent results except that the $V_2O_5$ is replaced by $P_2O_5$ and the nucleation temperature is 435° C. and the devitrification temperature is 570° C.

*Example III*

The procedure of Example I is repeated with the same excellent results except that the base glass has a coefficient of expansion of $90 \times 10^{-7}$ per ° C., the nucleation temperature is 460° C., and the devitrification temperature is 595° C.

*Example IV*

The procedure of Example III is repeated under the same reaction conditions but the composition of the solder glass is 70% PbO, 28.5% $B_2O_3$ and 1.5% $P_2O_5$.

*Example V*

The procedure of Example I is repeated with similar results except that the nucleation temperature is 415° C., the devitrification temperature is 570° C., and the solder glass composition is 70% PbO, 24% $B_2O_3$, and 6% $P_2O_5$.

*Example VI*

The procedure of Example I is repeated with similar results except that the devitrification temperature is 500° C. and the composition of the solder glass is 71% PbO, 16% $B_2O_3$, 1% $Cr_2O_3$, and the remainder consists of a mixture of $As_2O_3$, BaO, $Al_2O_3$, and $Ag_2O$.

*Example VII*

The procedure of Example I is repeated with excellent results except that the nucleating temperature is 460° C., the devitrifying temperature is 567° C., and the composition of the solder is 70% PbO, 27% $B_2O_3$, and 3% $V_2O_5$.

*Example VIII*

The procedure of Example III above is repeated except that the devitrifying temperature is 570° C., the nucleation temperature is 415° C., and the composition of the solder glass is 70% PbO, 24% $B_2O_3$, and 6% $V_2O_5$.

*Example IX*

The procedure of Example III is repeated with excellent results except that the base glasses being bonded together are different, that is, one glass is the same as that employed in Example I while the other base glass is the same as that employed in Example III.

*Example X*

The procedure of Example I is repeated with similar results except that a narrow ribbon of platinum is substituted for one of the base glasses.

*Example XI*

The procedure of Example I is repeated except that the article being bonded together by the solder glass are two Monel metal strips each 10 x 1 x 1 cm.

It is to be understood that the present invention is applicable in general to the bonding together of any preformed articles providing their thermal expansion characteristics are sufficiently comparable and similar so as to permit fusion sealing by the sealing or solder glass disclosed in this specification. Accordingly the process of this invention contemplates the joining together of glass to ceramic, ceramic to ceramic, glass to glass, glass to metal (or alloy), and metal (or alloy) to metal (alloy). By way of example the process of this invention has particular application to the formation of the seal between the panel and funnel of cathode ray and television tubes. Various metals and alloys which may be bonded to each other or to a glass base include tungsten, platinum, annealed stainless steel, nickel steels, platinum-iridium alloys, and nickel alloys.

The sealing or solder glasses employed in this invention are of the lead-borate type and have the following composition:

| | Weight percent |
|---|---|
| PbO | 70–73 |
| $B_2O_3$ | 15–29 |
| $P_2O_5$ | 0.1–10 |
| $V_2O_5$ | 0.1–10 |
| $Cr_2O_3$ | 0.1–1 |
| Misc. oxides ($As_2O_3$, BaO, $Al_2O_3$, $Ag_2O$) | 0–13 |

The $P_2O_5$, $V_2O_5$ and $Cr_2O_3$ are internal nucleating agents of the invention. One or more of these components can be employed and the total of these internal nucleating agents does not exceed 10 percent nor is less than 0.1 percent.

Preferred compositions for use in the present method are those consisting essentially of 70–73% PbO, 24–29% $B_2O_3$ and 0.3–6% of a mixture of $P_2O_5$ and $V_2O_5$, or 0.3–6% of either of these latter two oxides.

Base glasses which have been found particularly suitable for the method of invention glasses usually contain at least 65% $SiO_2$. However, any glass having similar thermal expansion characteristics may be employed in the present process. Compositions of base glasses employed include the following:

| Component: | Percent range |
|---|---|
| $SiO_2$ | 64–69 |
| BaO | 7–13 |
| $K_2O$ | 7–10 |
| $Na_2O$ | 6–8 |
| MgO+CaO | 0.1–7 |
| $Al_2O_3$ | 3–5 |
| Misc. compounds (MnO, $Sb_2O_3$, $As_2O_3$, $F_2$) | 0.1–2 |

While there has been shown what is considered to be a preferred embodiment of the invention, it will be manifest that many changes and modifications may be made therein without departing from the essential spirit of the invention. It is intended, therefore, in the annexed claims to cover all such changes and manifestations as fall within the true scope of the invention.

What is claimed is:

1. A method of joining preformed bodies having thermal expansion characteristics sufficiently comparable to permit their being fusion sealed with an intermediate sealing material which includes the steps of (a) forming a fused glass seal with a devitrifiable solder glass consisting essentially of (1) a lead-borate glass containing 70–73% PbO and 15 to 29% $B_2O_3$ and (2) 0.1–10% total of at least one oxide selected from the group consisting of $P_2O_5$, $V_2O_5$, and $Cr_2O_3$, the amount of $Cr_2O_3$ selected not exceeding 1% and thereafter (b) devitrifying the fused glass seal.

2. The method of claim 1 in which the oxide is $P_2O_5$.
3. The method of claim 1 in which the oxide is $V_2O_5$.
4. The method of claim 1 in which the oxide is $Cr_2O_3$.

5. A method of joining preformed bodies having thermal expansion characteristics sufficiently comparable to permit their being fusion sealed with an intermediate sealing material which includes the steps of (a) forming a fused glass seal with a devitrifiable solder glass consisting essentially of (1) a lead borate glass containing 70–73% PbO and 24–29% $B_2O_3$, and (2) a nucleating agent consisting of 0.3–6 percent by weight of a mixture of $P_2O_5$ and $V_2O_5$ and thereafter (b) devitrifying the fused glass seal.

6. A method of joining preformed bodies having thermal expansion characteristics sufficiently comparable to permit their being fusion sealed with an intermediate sealing material which includes the steps of (a) forming a fused glass seal with a devitrifiable solder glass consisting essentially of (1) a lead borate glass containing 70–73% PbO and 24–29% $B_2O_3$, and (2) a nucleating agent consisting of 0.3–6% by weight of $P_2O_5$ and thereafter (b) devitrifying the fused glass seal.

7. A method of joining preformed bodies having thermal expansion characteristics sufficiently comparable to permit their being fusion sealed with an intermediate sealing material which includes the steps of (a) forming a fused glass seal with a devitrifiable solder glass consisting essentially of (1) a lead-borate glass containing 70–73% PbO and 15–29% $B_2O_3$; (2) up to 13% of miscellaneous oxides selected from the group consisting of $Al_2O_3$, $As_2O_3$, BaO, and $Ag_2O$; and (3) 0.1–10% total of at least one internal nucleating agent selected from the group consisting of $P_2O_5$, $V_2O_5$, and $Cr_2O_3$, the amount of $Cr_2O_3$ selected not exceeding 1% and thereafter (b) devitrifying the fused glass seal.

8. In a method of making a devitrified product, the steps of (1) melting a glass batch consisting essentially of the following components in percent by weight; 70 to 73 percent of PbO, 15 to 29 percent of $B_2O_3$, 0 to 13 percent of miscellaneous oxides selected from the class consisting of $Al_2O_3$, BaO, $As_2O_3$, and $Ag_2O$; and 0.1 to 10 percent of at least one nucleating agent selected from the group consisting of $P_2O_5$, $Cr_2O_3$, and $V_2O_5$, the amount of $Cr_2O_3$ selected not exceeding 1 percent; and (2) heat treating the resultant vitreous composition to obtain a substantially devitrified product.

9. In a method of making a devitrified product, the steps of (1) melting a glass batch consisting essentially of the following components in percent by weight: 70 to 73 percent of PbO, 24 to 29 percent of $B_2O_3$, and a nucleating agent consisting of 0.3 to 6 percent of $V_2O_5$; and (2) heat treating the resultant vitreous composition to obtain a substantially devitrified product.

10. The method of claim 9 in which the nucleating agent is $V_2O_5$.

11. A method of joining preformed bodies having thermal expansion characteristics sufficiently comparable to permit their being fusion sealed with an intermediate sealing glass by forming a fused glass seal with a devitrifiable sealing glass containing an internal nucleating agent in the sealing glass composition, heating a sealing area including the sealing glass and thereby internally nucleating the sealing glass, and thereafter heating the sealing area at a higher temperature than said first mentioned heating, thereby devitrifying the sealing glass.

12. A composite article comprising preformed components and a layer of sealing material between said components and integrally bonded thereto, said sealing material consisting essentially of a devitrified solder glass having a composition of 70–73% PbO; 15–29% $B_2O_3$; and 0.1–10% total of at least one internal nucleating agent selected from the group consisting of $Cr_2O_3$, $P_2O_5$ and $V_2O_5$, the amount of $Cr_2O_3$ selected not exceeding 1%, and having thermal expansion characteristics comparable with those of the preformed components.

13. The article of claim 12 in which at least one of the preformed components is glass.

14. The article of claim 12 in which at least one of the preformed components is of metal.

15. The article of claim 12 in which at least one of the preformed components is a ceramic.

16. A composite article comprising preformed components and a layer of sealing material between said components and integrally bonded thereto, said sealing material consisting essentially of a devitrified solder glass having a composition of 70–73% PbO; 24–29% $B_2O_3$; and 0.3–6% by weight of a mixture of $P_2O_5$ and $V_2O_5$ and having thermal expansion characteristics comparable with those of the preformed components.

17. A composite article comprising preformed components and a layer of sealing material between said components and integrally bonded thereto, said sealing material consisting essentially of a devitrified solder glass having a composition of 70–73% PbO; 24–29% $B_2O_3$; and 0.3–6% by weight of $P_2O_5$ and having thermal expansion characteristics comparable with those of the preformed components.

18. A composite article comprising preformed components and a layer of sealing material between said components and integrally bonded thereto, said sealing material consisting essentially of a devitrified solder glass having a composition of 70–73% PbO; 24–29% $B_2O_3$; and 0.3–6% by weight of $V_2O_5$ and having thermal expansion characteristics comparable with those of the preformed components.

19. A devitrified product consisting essentially of the following components in percent by weight: 70 to 73 percent of PbO, 15 to 29 percent of $B_2O_3$, 0 to 13 percent of miscellaneous oxides selected from the class consisting of $Al_2O_3$, BaO, $As_2O_3$, and $Ag_2O$; and 0.1 to 10 percent of at least one nucleating agent selected from the group consisting of $P_2O_5$, $Cr_2O_3$, and $V_2O_5$, the amount of $Cr_2O_3$ selected not exceeding 1 percent; and heat treating the resultant vitreous composition to obtain a substantially devitrified product.

20. A devitrifiable glass composition comprising 70–73% by weight of PbO, 15–29% by weight of $B_2O_3$, and 0.3–10% by weight of a nucleating agent selected from the group consisting of $P_2O_5$, $V_2O_5$, and $Cr_2O_3$, the amount of $Cr_2O_3$ selected not exceeding 1 percent.

References Cited in the file of this patent

UNITED STATES PATENTS

| | | |
|---|---|---|
| 1,814,012 | Taft | July 14, 1931 |
| 2,113,818 | Sullivan | Apr. 12, 1938 |
| 2,663,658 | Schurecht | Dec. 22, 1953 |
| 2,852,352 | Landran | Sept. 16, 1958 |
| 2,876,120 | Machlan | Mar. 3, 1959 |
| 2,889,952 | Claypoole | June 9, 1959 |
| 2,920,971 | Stookey | Jan. 12, 1960 |

FOREIGN PATENTS

| | | |
|---|---|---|
| 634,548 | Great Britain | Mar. 22, 1950 |

OTHER REFERENCES

"Phase Diagrams for Ceramists," by Levin, McMurdie and Hall, pub. by The American Ceramic Society, Columbus, Ohio, 1956. Pages 14 to 25 and 206.

"Handbook of Glass Manufacture," volume II by Fay V. Tooley, pub. by Ogden Publishing Co., 55 West 42nd Street, New York 36, N.Y., 1960. Pages 187 to 199.